United States Patent [19]
Anichini

[11] 3,906,470
[45] Sept. 16, 1975

[54] MECHANICAL-ELECTRICAL TRANSDUCER GAUGE PROVIDED WITH A CIRCUIT FOR MAKING LINEAR THE RESPONSE OF THE GAUGE

[75] Inventor: Cesare Anichini, Florence, Italy

[73] Assignee: Finike Italiana Marposs-Soc. In Accomandita Semplice di Mario Possati & C., Bentivoglio, Italy

[22] Filed: June 20, 1973

[21] Appl. No.: 371,686

[30] Foreign Application Priority Data
June 28, 1972 Italy .................................. 3472/72

[52] U.S. Cl. ................ 340/195; 340/178; 340/186
[51] Int. Cl. ............................................ G08c 19/06
[58] Field of Search ............. 340/211; 340/195, 200

[56] References Cited
UNITED STATES PATENTS

| | | | |
|---|---|---|---|
| 2,288,838 | 7/1942 | Pike | 340/200 |
| 2,423,617 | 7/1947 | Rath | 340/200 |
| 2,672,603 | 3/1954 | Cutler | 340/195 |
| 3,252,108 | 5/1966 | Gregory | 340/195 |
| 3,254,333 | 5/1966 | Baumoel | 340/200 |
| 3,564,397 | 2/1971 | Sargent | 340/200 |

*Primary Examiner*—Thomas B. Habecker

[57] ABSTRACT

A circuit for making linear the response to a mechanical-electrical transducer gauge having variable impedance means within an electrical detecting circuit including a compensating system comprising a feedback loop provided with an amplifier and a compensating impedance constituted by resistive and reactive components. The feedback loop generates an output electrical quantity equal in amplitude and opposed in phase to that absorbed by the undesired impedances. The amplifier includes a grounded collector transistor. The compensating impedance comprises a resistance and an inductance connected in parallel and connected at the input of the feedback loop. The inductance consists of the primary inductance of a transformer with the secondary of the transformer constituting the input of the feedback loop.

3 Claims, 3 Drawing Figures

PATENTED SEP 16 1975　　　　　　　　　　　　　　3,906,470

MECHANICAL-ELECTRICAL TRANSDUCER GAUGE PROVIDED WITH A CIRCUIT FOR MAKING LINEAR THE RESPONSE OF THE GAUGE

The present invention relates to a mechanical-electrical transducer gauge provided with a circuit for making linear the gauge response. In particular, the invention relates to a gauge circuit for compensating the reactive and resistive components of the electrical quantities utilized for detecting and visualizing the measurements.

These components give rise, if they are not compensated, to linearity errors.

As it is well known, the gauges having mechanical-electrical transducers comprise mechanical feelers whose motions cause, for example, position of the the core of an inductor or the thickness of the dielectric of a capacitor to change.

The inductor or the capacitor, respectively, are comprised in a detecting circuit supplied with constant-amplitude a.c. current or constant-amplitude a.c. voltage.

By detecting the changes of the voltage or of the current, respectively, it is possible to determine the feeler position and the size of the workpiece to be checked.

One of the most important characteristics of a transducer is the response linearity.

In fact it is desirable that a linear relationship does exist, in a wide measuring range, between the position of the feelers and the variations of the electrical quantities utilized for detecting the measurements.

In conventional gauges with inductive transducers (the following description will refer to inductive transducers, as they are more commonly used) a compensation is made by means of a capacitor connected in series in the detecting circuit.

The limits and drawbacks of this compensation are evident. The capacitor can only compensate inductive reactances. The undesired electrical resistances are not compensated at all. The compensation of inductive reactances is only obtainable at a determined frequency.

In consequence thereof the measurement range which can be considered linear is narrow and in this range it is necessary to supply the electrical detecting circuit with a generator having rigorously constant frequency.

An object of the present invention is to provide a gauge circuit for making linear the response of a mechanical-electrical transducer gauge, and adapted to compensate undesired resistances and reactances of the detecting circuits of the gauge, so as to obtain a linear output within a wide measuring range and for a wide range of the supply frequencies of the detecting circuits.

Further objects and advantages of the invention will become apparent from the following description of a gauge circuit for making linear the response of a mechanical-electrical transducer gauge having variable-impedance means comprised in an electrical detecting circuit. The gauge circuit comprises, according to the present invention, compensating means for compensating the undesired resistive and reactive impedances of the detecting circuit. The means comprise a feedback loop provided with an amplifier and a compensating impedance constituted by resistive and reactive components. The feedback loop generates an output electrical quantity equal in amplitude and opposted in phase to that absorbed by said undesired impedances.

The present invention will be described more in detail with reference to the preferred embodiment illustrated in the enclosed drawing, in which.

Figure 1:
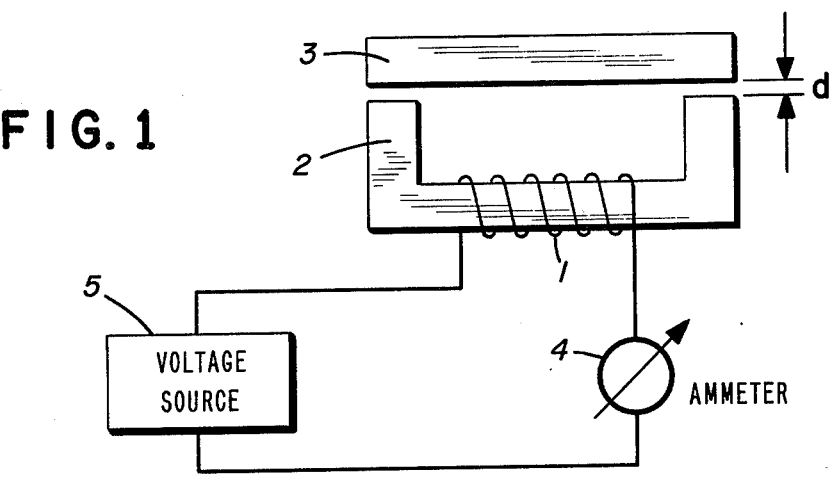
FIG. 1 is a schematic diagram, not comprised in the invention, which shows the essential features of the inductive transducer of a gauge.

The transducer of FIG. 1 comprises a coil 1 wound on a C-shaped ferromagnetic core 2.

A ferromagnetic bar 3 is located opposite to the ends of core 2.

Bar 3 is rigidly connected to the gauge feeler (not shown) and therefore the variations of the air gap thickness d are indicative of the size deviations of the workpieces to be measured with reference to their nominal size.

Variations of $d$ are detected by measuring, by means of an ammeter 4, the current delivered to coil 1 by a voltage source 5.

The detecting circuit would have linear response, at a determined supply frequence, if ammeter 4 and source 5 had internal resistance equal to zero and the inductance of coil 1, supposed purely reactive, were inversely proportional to $d$.

As a matter of fact, connecting wires, ammeter 4 and coil 1 have a certain electrical resistance.

Besides, since the magnetic flux linked with coil 1 partially closes without passing through bar 3, the coil inductance consists of two parts, one inversely proportional to d and the other independent of $d$.

Figure 2:
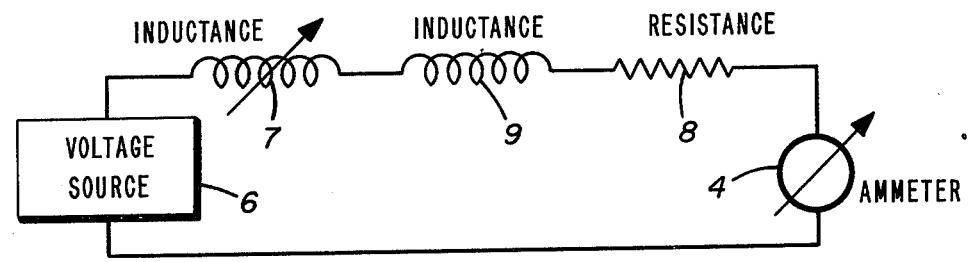
FIG. 2 is an electric diagram of the transducer of FIG. 1.

Therefore the electric circuit can be schematized as shown in FIG. 2. An ideal voltage source 6 and an ideal ammeter 4 (both having internal resistance equal to zero) are series-connected with an inductance 7, of value $L_r$, inversely proportional to $d$, a resistance 8, of value $r$, and an inductance 9, of value $L_o$.

Figure 3:
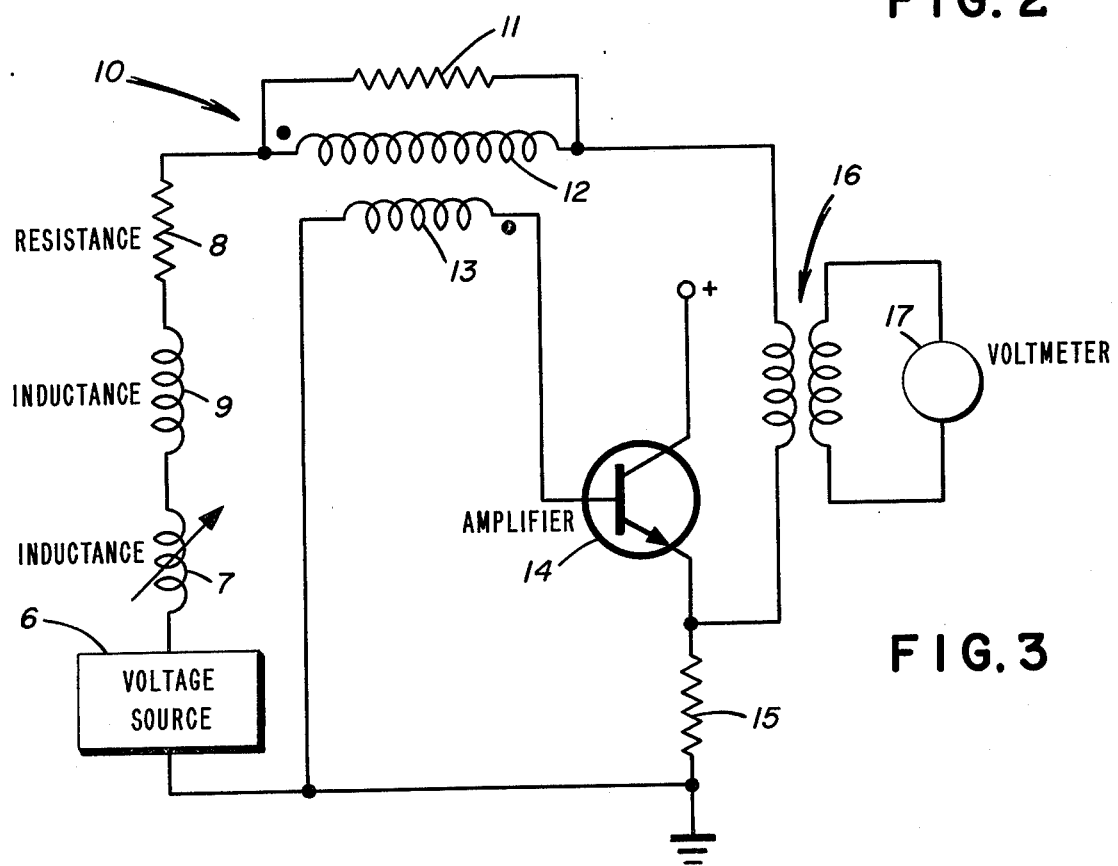
FIG. 3 shows the diagram of the preferred embodiment of the present invention, given for the purpose of illustration only.

$L_o$ for not too wide measuring ranges is independent of $d$. FIG. 3 shows a circuit adapted to obtain a linear gauge-response by means of the compensation of the undesired dissipative and reactive components which are represented by resistance 8 and inductance 9.

The circuit comprises a compensating impedance 10, formed by a resistance 11 connected in parallel with a coil 12 constituting the primary of a transformer.

The transformer has a secondary coil 13 across which there is a voltage opposed in phase with respect to the primary voltage. Coil 13 is connected to the base of an amplifier 14, consisting of a NPN transistor whose collector is grounded for the a.c. components.

As it is known, with this connection amplifier 14 has high input impedance and relatively low output impedance.

The voltage gain is slightly lower than unity. The output voltage, i.e., the voltage across resistance 15, has substantially the same value (absolute value and phase) as the input voltage (voltage across coil 13).

Moreover, the circuit comprises a transformer 16.

A voltmeter 17 is connected across secondary coil of transformer 16.

Through a suitable choice of components 11, 12, 13, 14, 15, the voltage across resistance 15 can be made equal as to the absolute value and opposed in phase with respect to the sum of the voltages across inductance 9, resistance 8, impedance 10 and the primary coil of transformer 16, respectively.

The use of compensating impedance 10, constituted by an inductance and a resistance, allows obtaining an input voltage for amplifier 14 suitably shifted in phase with respect to voltage supplied by source 6.

The circuit of amplifier 14 provides a positive feedback loop.

By means of this phase shifting and the response characteristics of the grounded collector amplifier 14 (which also has the advantage of possessing a broad bandwidth) it is therefore possible to compensate, in a broad range of frequencies, not only the undesired reactive components, but also the resistive components of the detecting circuit.

In this way voltmeter 17 can be calibrated so that it is possible to read thereon the sizes or the size deviations of the workpieces to be measured, even if the frequency of the voltage supplied by source 6 changes.

Source 6 must supply only a constant amplitude voltage. It is not necessary for this voltage to be stabilized and sinusoidal.

It is clear that the gauge circuit described above can undergo changes and variants equivalent from a functional and constructional standpoint without departing from the scope of the invention.

For example the circuit can be modified on the basis of simple considerations and of the theorems of the conventional electrical technology, so as to be used for different types of gauges, for example for capacitive transducer gauges.

What is claimed is:

1. A transducer gauge for measuring a physical quantity through measurement of an electrical quantity depending on the physical quantity, comprising:

a. a voltage source;
   b. an inductive transducer connected in a series circuit fed by the voltage source, the transducer having an impedance depending in a nonlinear way on said physical quantity; the total impedance of the circuit being representable by impedance elements linearly variable with the physical quantity and impedance elements independent of variations of the physical quantity;
   c. measuring means for measuring the transducer current;
   d. a compensating circuit for compensating the defects of linearity of the elements of said series circuit, said compensating circuit including:
      $d_1$. a transformer having a primary coil and a secondary coil, the primary coil being connected in series in said series circuit and having a resistance connected in parallel;
      $d_2$. amplifier means having an input connected with said secondary coil and an output coupled with said series circuit, for generating on said output a compensation voltage equal as to the absolute value and opposed in phase with respect to the total voltage across said impedance elements independent of variations of the physical quantity, whereby said transducer current is linearized with respect to variations of the physical quantity.

2. The transducer gauge according to claim 1, wherein the output of said amplifier means consists of a resistance connected in series with said first circuit.

3. The transducer gauge according to claim 2, wherein said amplifier means comprises a grounded collector transistor having the base coupled with said secondary coil of the transformer and the emitter coupled with said resistance connected in series with said first circuit.

* * * * *